United States Patent [19]

Inagaki

[11] Patent Number: 4,788,644
[45] Date of Patent: Nov. 29, 1988

[54] METHOD FOR CONTROLLING AN ACCELERATION SLIP OF A VEHICLE

[75] Inventor: Takafumi Inagaki, Toyota, Japan

[73] Assignee: Toyota Jidosha Kabushiki Kaisha, Toyota, Japan

[21] Appl. No.: 41,541

[22] Filed: Apr. 23, 1987

[30] Foreign Application Priority Data

Apr. 23, 1986 [JP] Japan .................................. 61-95458

[51] Int. Cl.⁴ ............................................... B60T 8/00
[52] U.S. Cl. ................................ 364/426.03; 180/197; 303/95; 303/100
[58] Field of Search ......................... 364/426; 180/197; 361/238; 303/95, 100, 104, 110

[56] References Cited

U.S. PATENT DOCUMENTS

| 4,361,871 | 11/1982 | Miller et al. | 180/197 |
| 4,530,059 | 7/1985 | Brearley et al. | 364/426 |
| 4,648,663 | 3/1987 | Nomura et al. | 180/197 |
| 4,681,374 | 7/1987 | Nakamura et al. | 180/197 |

Primary Examiner—Gary Chin
Attorney, Agent, or Firm—Oblon, Fisher, Spivak, McClelland, & Maier

[57] ABSTRACT

An acceleration slip control method quickly terminate an acceleration slip control when it is no longer necessary. A quick detection of the termination adopts, as terminating conditions, a preset time duration of reduction of drive wheel brake force and reduction of the drive wheel slip rate. The quick termination of the acceleration slip control enables immediate voluntary acceleration and better maneuverability of the vehicle.

8 Claims, 6 Drawing Sheets

METHOD FOR CONTROLLING AN ACCELERATION SLIP OF A VEHICLE

BACKGROUND OF THE INVENTION

1. Field of the Invention

This invention relates to a wheel acceleration slip control system which controls the rotation of drive wheels to increase the frictional force between the drive wheels and the road surface at the time of acceleration.

2. Background of the Related Art

For obtaining the most suitable braking force without wheel lock at the time of braking, so called anti-skid control system has been popularly used. This system works in such a manner that the wheel speed (rotation speed multiplied by the wheel circumference) during a braking is controlled to stay a little lower than the vehicle running speed ("vehicle speed" hereinafter), resulting in the greatest friction force between the wheel tire and the road surface. The formula below shows the relation among the slip rate percentage (S), the vehicle speed (Vs) and the wheel speed (V).

$$S = [(Vs - V)/Vs] \times 100$$

As shown in FIG. 6, when the slip rate (S) comes close to 10%, the friction force M between the tire and the road surface is the greatest, and the side force F which is the resistance force against a side slip is not so small. For this reason braking and its release are alternatively and properly repeated to control the vehicle speed (V) in order to obtain the slip rate (S) around 10%.

So-called traction control has been proposed for the problems arising during acceleration (Japan patent application No. Sho 59-275532, Japan patent application No. Sho 60-294439 and others). This is intended to control an acceleration slip that prevents sufficient acceleration and that may result in inefficient fuel consumption. This control system employs a feedback control in which an acceleration slip control is started when a drive wheel slip exceeds a predetermined value. Control is achieved by means of engine output control or brake control or even by the both in order to obtain a low slip value.

In the acceleration slip control system described above, slip conditions for which feedback control is started, i.e., the threshold conditions are preferably set to correspond to a higher slip rate or a higher slip speed than a target value at which the feedback control system should ideally be targeted. This is to prevent the system from overreacting to a minor roughness or tiny muddy portion of the road. (This is shown in the Japan patent application No. Sho 59-275532.)

In this feedback system, when the drive wheel's slip exceeds the threshold, both the engine output control and brake control are started to lower the slip rate to a predetermined target value below the threshold. The engine output is controlled by a secondary throttle valve provided in series with a normal main throttle valve in the intake pipe of the internal combustion engine. The main throttle valve is linked to the accelerator pedal and the secondary throttle valve is rotated by a motor controlled by an electronic circuit. The opening of the secondary throttle valve is decreased and/or the brake is applied when the slip is greater than the target and the secondary throttle valve opening is increased and/or the brake is released when the slip is less than the target.

The acceleration feedback control including the brake control is finished when the secondary throttle valve reaches substantially its open-most position. A new feedback control is started when the driving wheel slip exceeds the threshold, which is higher than the feedback control target.

SUMMARY OF THE INVENTION

This ending condition, however, has a problem. That is, there is a time lag from the point at which the acceleration slip control is actually no longer necessary to the point at which the secondary throttle valve is fully opened, since the secondary throttle valve is moved at a relatively low speed. A small degree of opening or closing of a throttle valve greatly affects the engine output. Thus, if the secondary throttle valve is opened or closed at a high speed, the engine output is affected too sharply. This causes not only the undesirable effect of an inaccurate control of the acceleration slip but also reduced maneuverability of the vehicle. In other words there exists a problem that if vehicle suddenly comes out of a muddy road onto a smooth road surface and the driver wants to immediately start acceleration, no rapid acceleration is possible until the secondary throttle valve is fully opened and the feedback control is finished.

The present invention has improved the prior ending conditions of the acceleration slip control, providing a quick termination of the acceleration slip control when the control is unnecessary and enabling a quick start at a normal acceleration.

The method adopted in the present invention in order to solve the problem mentioned above includes the following steps.

First a slip rate of the drive wheel is detected and it is determined whether it is greater than a first preset value. If the detected slip rate is determined to be greater than the first preset value, a slip control for reducing the slip rate is started. The slip control includes at least the steps of initiating the control of a brake system of the drive wheel. Then it is determined whether the brake force is less than a predetermined value and whether the slip rate is less than a second preset value. Here, the second preset value is less than the first preset value. After a preset time period and if the detected brake force is determined to be less than the predetermined value and the detected slip rate is determined to be less than the second preset value during the preset time period, the slip control is terminated.

More particularly, during driving, a slip rate of the drive wheel is always detected. The slip rate may be, for example, detected by comparing the drive wheel rotation speed and the non-drive wheel rotation speed. When the detected drive wheel slip rate exceeds a predetermined threshold for starting an acceleration slip control, braking of the drive wheel in order to reduce the acceleration slip down to a predetermined target value which is below the threshold is started. The target value is preferably set at such value that the friction force between the drive wheel and the road surface is greatest. It may be replaced by a target range around the maximum friction value. The present invention is applicable to a system including engine output control as well as the brake force control. In this case, the engine output control is also started and executed along with the brake force control for the drive wheel for the acceleration slip control.

The terminating condition of the acceleration slip control is explained with reference to the brief flow chart of FIG. 1. When the acceleration slip control is executed (S1), it is determined whether the brake force is to be reduced (S2) and whether the drive wheel (DW) slip is under a prset value (S3). When the both conditions are satisfied over a duration of a preset period (S4), the acceleration slip control is ended (S5). If at least one of the conditions are not satisfied within the preset period, the acceleration slip control is continued (S1).

Such terminating conditions are adopted because of the following reasons. During control of the acceleration slip, there are occasions that the slip rate of the drive wheel decreases for a short time as a result of the slip control measures. This occasion should not be judged as the terminating condition for the slip control. The necessary case for the termination is a case where the drive wheel slip rate decreases due to some external conditions, e.g., the drive wheel's coming out of mud onto a high friction coefficient road surface.

The reference value at step S3 is set to be lower than the predetermined control target value. The preset period at step S4 is preferred to be short for enabling the driver to quickly restart voluntary acceleration but is set to be a little longer than the cycle time of the rotation speed fluctuation of the drive wheel arising due to the acceleration slip control. After the slip control is terminated, the driver can normally accelerate without restriction by the acceleration slip control, since it is not restarted until the drive wheel slip rate exceeds the high threshold value.

When the brake system of drive wheel utilizes a hydraulic system, the reduction of the brake force can be detected by the reduction of the hydraulic pressure. Preferably the reference value for the brake force in reference to the terminating condition is set to be substantially zero.

BRIEF DESCRIPTION OF THE DRAWINGS

The invention may be best understood by reference to the following description of a preferred embodiment and the drawings in which.

DETAILED DESCRIPTION OF THE PREFERRED EMBODIMENT

Set forth below is an explanation of an embodiment of the present invention applied to an acceleration slip control device.

Figure 1:
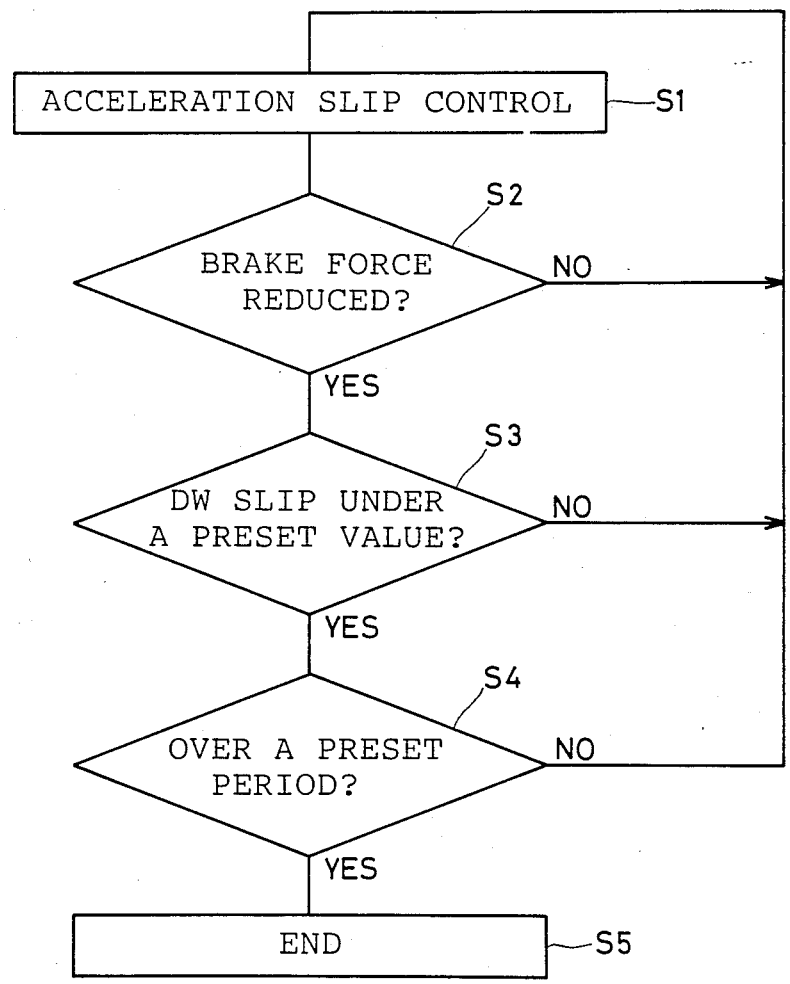
FIG. 1 is a flow chart showing the outline of the present invention.
Figure 2:
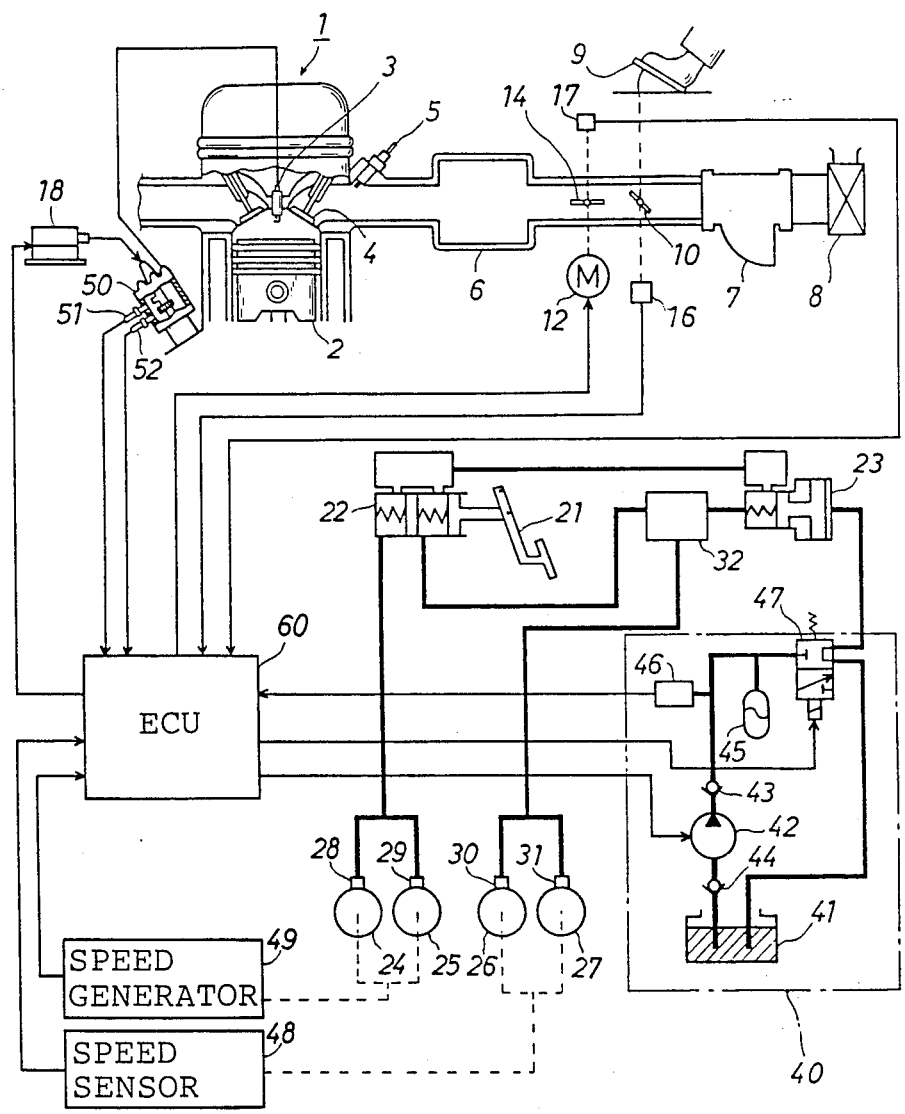
FIG. 2 is a system diagram of the acceleration slip control system and the peripheral equipment of a vehicle on which the embodiment of the present invention is applied.

FIG. 2 is a schematic system diagram illustrating the areas of the engine and the wheel parts of a vehicle on which the acceleration slip control system is mounted. The numerals in the drawing signify as follows: 1 - an engine, 2 - a piston, 3 - a spark plug, 4 - an intake valve, 5 - a fuel injection valve, 6 - a surge tank, 7 - an air flow meter, 8 - an air cleaner. In the present embodiment, in addition to an existing first throttle valve 10, a secondary throttle valve 14 is provided in the intake passage between the air flow meter 7 and the surge tank 6. The two throttle valves 10, 14 adjust air intake by working in different manners; the first throttle valve 10 is linked with the acceleration pedal 9, while the secondary throttle valve 14 is driven by a DC motor 12. The first throttle valve opening sensor 16 is provided on the first throttle valve 10. This sensor outputs an opening signal $\theta M$ corresponding to the opening degree of the throttle. Likewise the secondary throttle valve 14 has the secondary throttle valve opening sensor 17 which outputs an opening signal $\theta 2$. The ignition coil 18 supplies the spark plug 3 with high voltage current.

Numeral 21 to numeral 31 refer to elements as follows: 21 - a brake pedal, 22 - a brake master cylinder for generating brake hydraulic pressure corresponding to a brake pedal stroke, 23 - a sub-master cylinder for generating brake hydraulic pressure in the case of an acceleration slip, 24 and 25 - left and right non-drive wheels, 26 and 27 - left and right drive road wheels, 28 through 31 - wheel slave cylinders provided on the wheels 24 through 27.

The brake master cylinder 22 is a tandem-type master cylinder. Two separate hydraulic lines from the brake master cylinder 22 convey brake hydraulic pressure to two groups; one group is the wheel cylinders 28 and 29 provided on the left and right non-drive wheels 24 and 25 respectively, the other group being the wheel cylinders 30 and 31 provided on the left and right drive wheels 26 and 27. On the other hand, brake hydraulic pressure generated in the sub-master cylinder 23 is for braking of the left and right drive wheels 26 and 27 only. Since this brake hydraulic pressure should be conveyed to wheel cylinders 30 and 31, independently of the brake hydraulic pressure from the brake master cylinder 22 to the same cylinders 30 and 31, a change valve 32 in the form of a shuttle valve is provided in the hydraulic system to the wheel cylinders 30 and 31. Hydraulic pressures from both the brake master cylinder 22 and the sub-master cylinder 23 go through the change valve 32, within which the greater hydraulic pressue of the two is selected and conveyed to the wheel cylinders 30 and 31.

The area inside the chain line 40 is a hydraulic system that drives the sub-master cylinder 23 to generate brake pressure in the case of a slip during an acceleration. An oil pump 42 pumps up oil for the hydraulic system from a reservoir tank 41. A back flow of the pumped oil is prevented by check valves 43 and 44. An accumulator 45 accumulates the high pressure oil to utilized it as an energy source for driving the sub-master cylinder 23. A hydraulic pressure switch 46 is turned ON when the hydraulic pressure of the oil from the oil pump 42 to the accumulator 45 decreases below a predetermined pressure. A two position valve 47 drives the sub-master cylinder 23 by changing its valve position and feeding the oil accumulated at the predetermined pressure in the accumulator 45 to the submaster cylinder 23 in the case that an acceleration slip is detected via the steps described below. The two position valve 47 employs a solenoid valve of a single solenoid type. In the normal condition this valve is fixed in the position as shown in the drawing by a spring, and a drive signal to the solenoid puts it in the alternative position. In the drawing, numeral 48 shows a drive wheel speed sensor and numeral 49 shows a non-drive wheel speed generator. The sensor 48 is installed on an output shaft of a transmission (not shown) and detects a drive wheel speed Vr which is a mean value of the two rotation speeds of driving wheels 26 and 27. The speed generator 49 outputs a non-drive wheel speed Vf which is a mean value of the two rotation speeds of non-drive wheels 28 and 29 detected by sensors provided at respective wheels 28 and 29.

In an ignition system of the engine 1, an ignition coil 18 delivers high voltage current necessary for ignition and a distributor 50 distributes the high voltage current from the coil 18 to a spark plug 3 of each cylinder in synchronism with the engine crank shaft (not shown) rotation.

In the distributor 50 are provided a rotation angle sensor 51 and a cylinder distinguishing sensor 52. The rotation angle sensor 51, which works as a rotation speed sensor as well, outputs a rotation angle signal for each 1/24 revolution of the distributor camshaft, i.e., each 30 degree revolution of the engine crank shaft. The cylinder distinguishing sensor 52 outputs a standard signal each revolution of the distributor camshaft, i.e. each two revolutions of the crankshaft.

Figure 3:
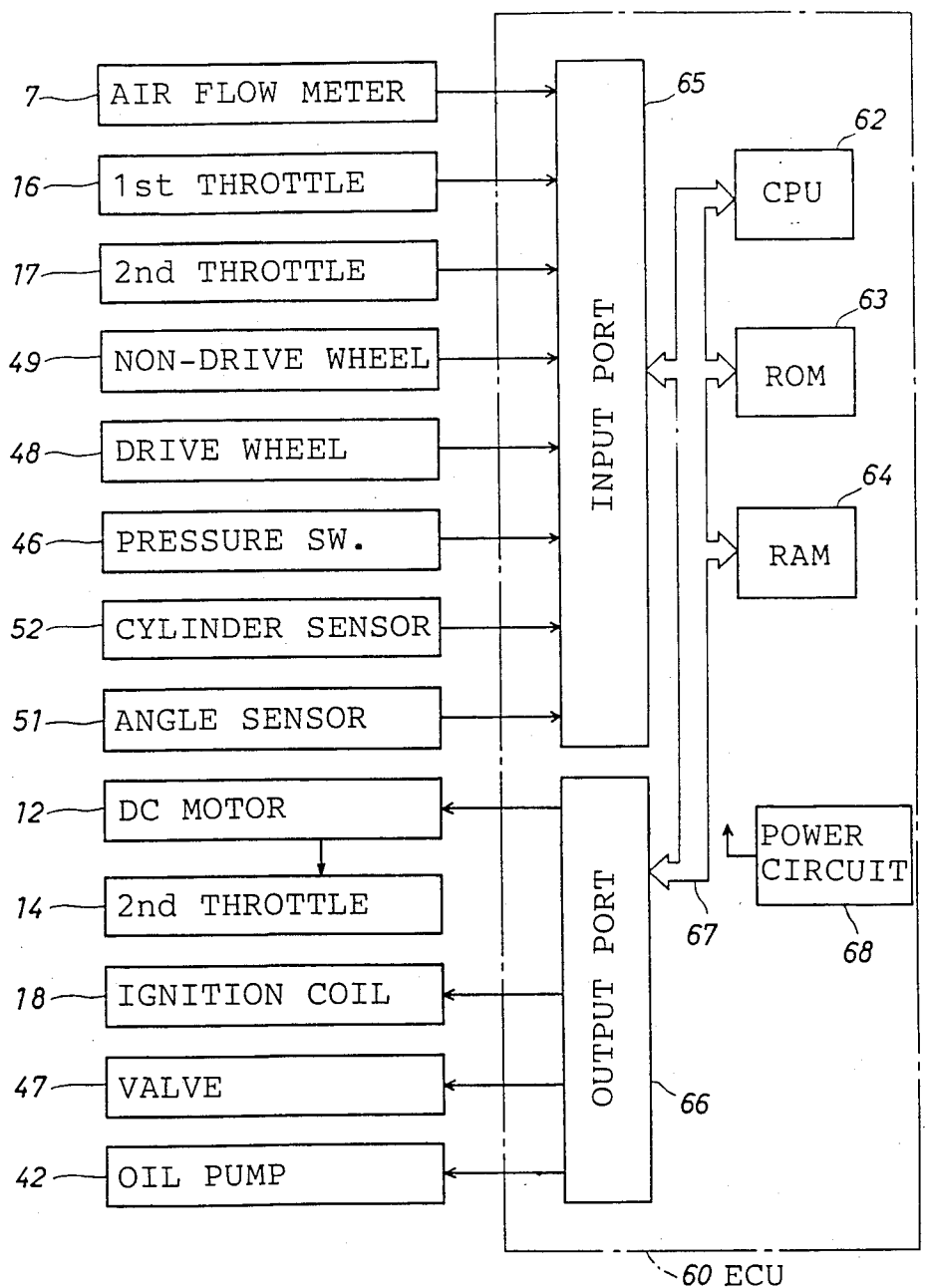
FIG. 3 shows a diagram of an electronic control unit used in the embodiment.

The signals from the various sensors are inputted to an electronic control unit (ECU) 60 and the ECU processes the signals to generate necessary signals to the above actuators The construction of the ECU and the peripheral units are shown in FIG. 3. This ECU 60 consists of a central processing unit (CPU) 62, a read only memory (ROM) 63, a random access memory (RAM) 64, an input port 65, an output port 66, a bus line 67 and a power circuit 68. The CPU 62, as directed by control programs retrieved from the ROM 63, inputs data from the hydraulic pressure switch 46, the drive wheel speed sensor 48, the non-drive wheel speed generator 49, the first throttle valve opening sensor 16, the secondary throttle valve opening sensor 17, the air flow meter 7, the cylinder distinguishing sensor 52 and the rotation angle sensor 51, and processes them to control the oil pressure pump 42, the two position valve 47, the ignition coil 18 and the DC motor 12 for the secondary throttle valve 14. The ROM 63 stores the control programs and necessary reference maps. The data from the sensors and the temporary data necessary for calculation and control are read and written in the RAM 64. The input port 65 is provided with a wave shaping circuit and a multiplexer for pre-processing the output signals from each sensor and for selectively delivering them to the CPU 62. The output port 66 is provided with a driving circuit that drives the ignition coil 18, the oil pump 42, the two position valve 47 and the DC motor 12 according to control signals from the CPU 62. The bus line 67 interconnects the CPU 62, the ROM 63, the RAM 64 with the input port 65 and the output port 66. A power circuit 68 supplies power to the various elements.

A basic function of the ECU 60 is as follows. It receives speed signals from the drive wheel speed sensor 48 and the non-drive wheel speed generator 49. When an acceleration slip is detected by a comparison of these signals, the ECU 60 increases the brake hydraulic pressure and so the brake force of the drive wheels 26 and 27, and decreases the engine output power by closing the secondary throttle valve 14 and by delaying the ignition signal timing. The above constitute the controls for decreasing the acceleration slip of the drive wheels 26, 27, which will be explained in more detail below. Besides the acceleration slip control, the ECU 60 is in charge of skid control for the drive wheels 26, 27. This control, which is operated only when the brake pedal 21 is applied and which is different from the acceleration slip control that is executed only when the acceleration pedal is applied, increases or decreases the brake hydraulic pressure by control of the two position valve 47 when a lock of a drive wheel 26 or 27 is detected, thus aiding the drive wheels 26, 27 to recover a road grip. The ECU 60 also controls the hydraulic pressure for the brake system. It keeps the oil pressure in the accumulator 45 constantly at a preset pressure by occasionally driving the oil pump 42.

Figure 4:
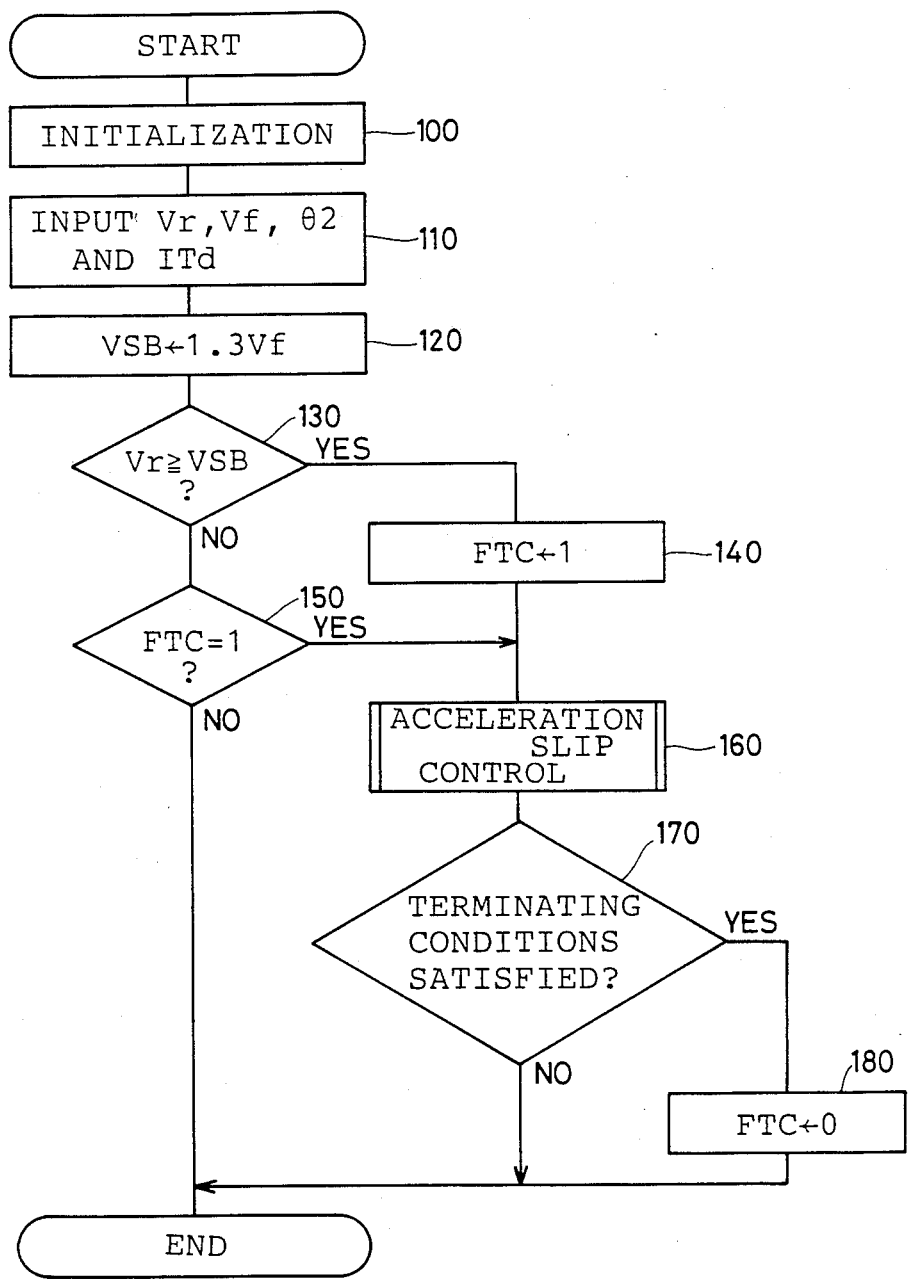
FIG. 4 is a flow chart illustrating the entire flow of the processing carried out in the embodiment.

Explained below is an acceleration slip control executed in the ECU 60 just described. The flow chart of FIG. 4 shows how the control program is executed.

When a processing of this routine starts, an initialization is executed at step 100, i.e., flags and counters set in the RAM 64 are reset.

At step 110, the drive wheel rotation speed Vr, the non-drive wheel rotation speed Vf, the secondary throttle valve opening $\theta2$ and a proper ignition timing angle ITd (this is measured by crank angle degree before top dead center of the first cylinder) are inputted. ITd is calculated in another program from various engine operating conditions detected by the air flow meter 7, the rotation angle sensor 51 and other sensors.

After the above data are inputted, a stand-by speed VSB is calculated at step 120. The stand-by speed VSB means a drive wheel rotation speed at which an acceleration slip control is determined to start. This stand-by speed VSB, or threshold, is, in the usual case, set at such a value that the slip rate of the drive wheel is around 30%, i.e., VSB is set at about 1.3·Vf.

At step 130 it is determined if the drive wheel speed Vr exceeds the stand-by speed VSB. If the answer is 'YES', the processing goes to step 140, where a flag FTC is set to be 1, and then goes to step 160. When the flag FTC is 1, it means that an acceleration slip control is in operation. At step 160, an acceleration slip control sequence is executed, which will be explained later. If the answer at step 130 is 'NO', a value of the flag FTC is checked at step 150 to determine if the acceleration slip control is already in operation or not. If FTC=1 here, the processing goes to step 160 in order to continue the acceleration slip control. This case arises when there has been a temporary drop of the drive wheel speed Vr during an acceleration slip control. If the answer at step 150 is 'NO', that is FTC=0, it signifies that no acceleration slip control is in operation and the speed of the driving wheels is low. In this case, there is no need for acceleration slip control and the routine ends here.

After acceleration slip control is executed at step 160, it is checked at step 170 if all the conditions predetermined to terminate the control are satisfied or not. When the answer is 'YES', the processing goes to step 180, where the flag FTC is reset to 0 and the routine ends here. If the answer at step 170 is 'NO', flag FTC is unchanged and the routine also ends here. In the latter case, as the flag FTC remains at 1, step 160 is again executed next time the routine is operated.

Figure 5:
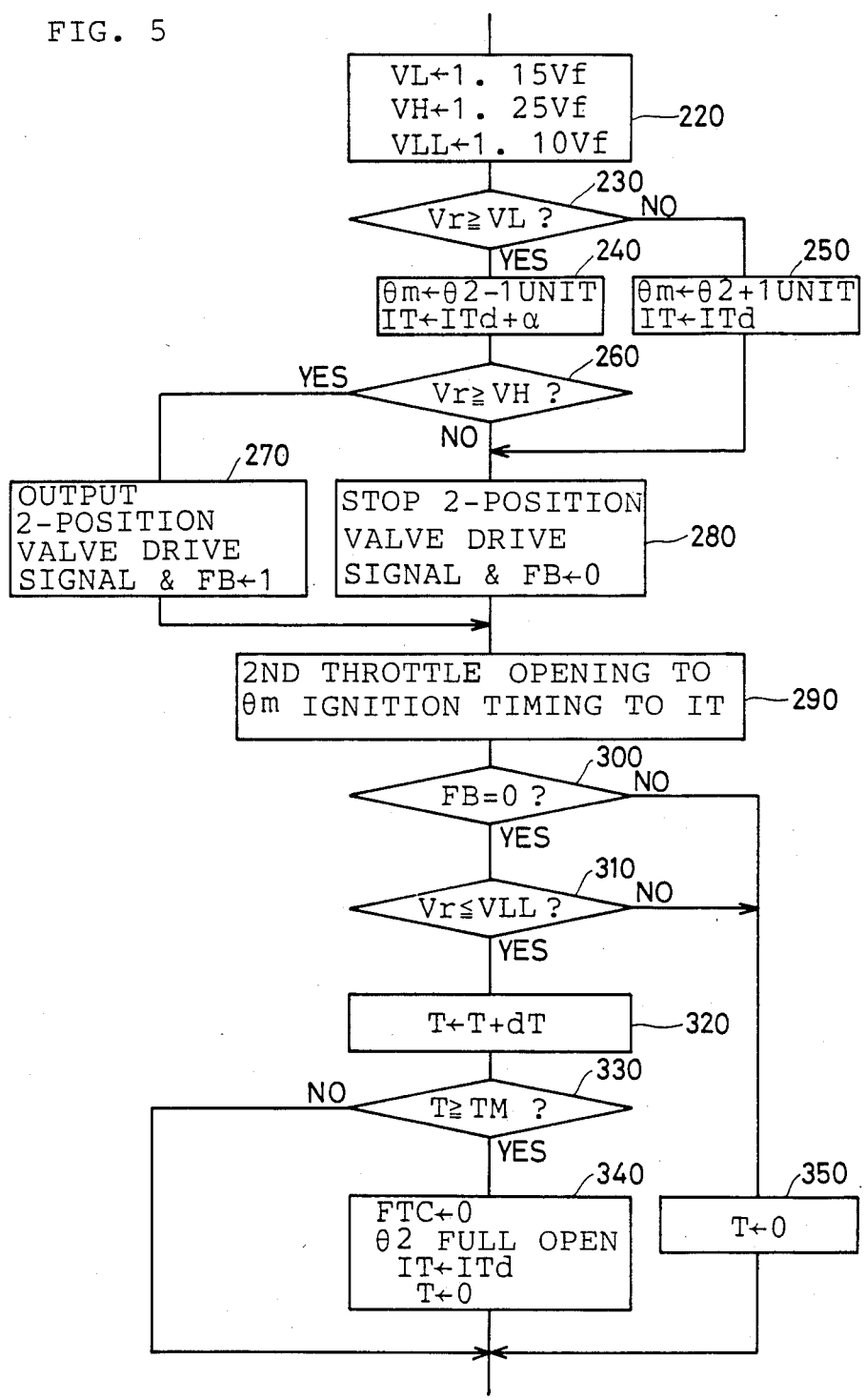
FIG. 5 is a flow chart illustrating a part of FIG. 4 in detail.
Figure 6:
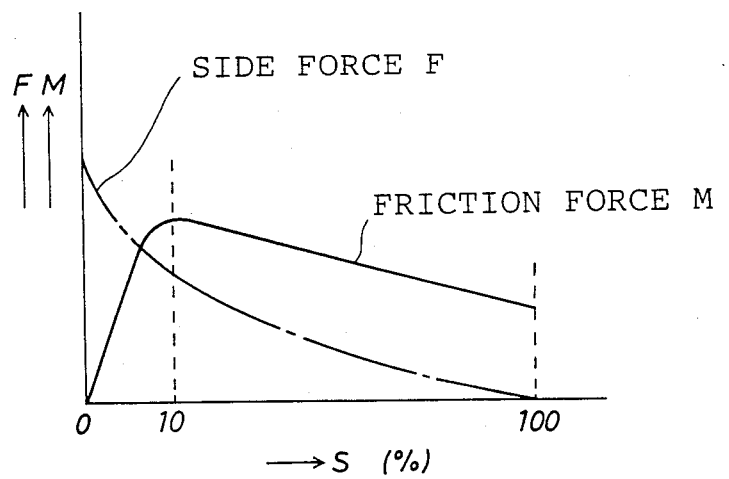
FIG. 6, which is already referred, is a graph showing the relations of the slip rate between the tire and the road surface to the side force, and the slip rate to the friction force.

Steps 160, 170 and 180 in FIG. 4 are explained in detail in FIG. 5. At step 220, a first reference speed VL and a second reference speed VH are calculated. The first reference speed VL is set to be at a value at which a slip rate is 15%, and the second reference speed VH is set at a value at which a slip rate is 25%. Furthermore at step 220, a termination speed VLL, at which a slip rate is 10%, is calculated.

At step 230 it is determined if the drive wheel speed Vr exceeds the first reference speed VL. With the answer 'YES', the processing advances to step 240. If the answer is 'NO', it goes to step 250.

At either step 240 or 250, a control target value $\theta$m of the secondary throttle valve opening and a control target value IT of the ignition timing are set. At step 240, $\theta$m and IT are so determined that the engine output decreases. Accordingly the value of $\theta$m is set at a one unit closed value from the present secondary throttle valve opening $\theta$2, and the ignition timing IT is set to be greater than the proper ignition timing ITd by an angle $\alpha$, i.e., the ignition timing is further retarded. On the other hand at step 250, $\theta$m and IT are so determined that engine output is increased. Therefore $\theta$m is set at a one unit opened value from $\theta$2 and the ignition timing IT is set at the value of the proper ignition timing ITd.

After $\theta$m and IT are set at step 240, it is determined at Step 260 if the drive wheel speed Vr exceeds the second reference speed VH. When the answer is 'YES', the processing advances to step 270, and when the answer is 'NO', the processing goes to step 280. When $\theta$m and IT are set at step 250, the processing also goes directly to step 280, just as in the case of 'NO' at step 260.

At step 270, a drive signal is outputted to the solenoid of the two position valve 47 in the hydraulic system 40. Since the two position valve 47 employs a solenoid valve of a single solenoid type, the two position valve 47 is set by the drive signal at a connecting position, as shown by the lower half of its diagram in FIG. 2, and the pressurized oil is delivered from the pump 42 to the sub-master cylinder 23. Tha change valve 32 is thus automatically operated to change the hydraulic pressure source from the brake master cylinder 22 to the sub-master cylinder 23. By these operations, a hydraulic pressue is transmitted from the sub-master cylinder 23 to the drive wheel cylinders 30, 31. This increases the hydraulic pressure in the drive wheel cylinders 30, 31 and the brake force, and also decreases the rotation speed of the drive wheels 26 and 27. At step 270, a Flag FB is set which shows the drive wheels 30, 31 are being controlled by the brake system. Then the processing goes to step 290.

At step 280, on the other hand, the drive signal for the two position valve 47 is stopped. The two position valve 47 returns to a normal shut position as shown in FIG. 2 and the brake oil in the sub-master cylinder 23 returns to the reservoir tank 41. As a result, the change valve 32 automatically operates to change the hydraulic pressure source from the sub-master cylinder 23 to the brake master cylinder 22. Thus the brake hydraulic pressure at the drive wheel cylinders 30, 31 is reduced as is the brake force. At the same time, the flag FB is reset to 0 at this step. Accordingly, the brake force can be detected by the position of valve 47. Then the processing advances to step 290. It should be noted that in a given sequence Vr will always initially be greater than VH since VH is less than the threshold value VSB. Therefore, brake control initiation will always occur, as will a subsequent reduction in brake force to a lower (i.e., second) value as Vr drops below VH later in the control sequence.

At step 290, the DC motor 12 is driven to set the secondary throttle valve 14 at the angle $\theta$m and the ignition timing is set at the updated value IT.

The processing for the actual control of an acceleration slip (i.e., step 160 of FIG. 4) is thus executed. Next comes the determination to terminate the control at steps 300 and after (i.e., step 170 of FIG. 4). If FB=1, which means the drive wheels are being controlled by the brake system, the processing goes to step 350. When FB=0, which shows the hydraulic pressure in the drive wheel cylinders 30, 31 by the acceleration slip control has decreased (i.e., Vr is no longer greater than VH) the processing goes to step 310, where it is determined whether the drive wheel speed Vr is less than the termination speed VLL. With the answer 'NO', the processing goes to step 350. When Vr$\leq$VLL, a value in timer T is increased by a unit dT at step 320. Then at step 330 it is checked whether or not this value of the timer T is greater than a predetermined value TM. The value TM here is a waiting time for judging termination conditions to be satisfied and is experimentally determined at an appropriate value The value TM is 1 to 3 seconds in normal cases. This value, however, should be smaller than the time required for the secondary throttle valve 14 to be fully opened by the processing of step 250. If the result of step 330 is 'YES', the routine proceeds to step 340 to terminate the acceleration slip control. Namely, the flag FTC is reset to 0, the secondary throttle opening $\theta$2 is rapidly opened to the fulle xtend and the ignition timing IT is set to the proper ignition timing ITd. After these processings are over, the driver is able to immediately accelerate as he or she wishes to. Furthermore the timer T is reset at step 340 and the routine ends here.

When the determination result is 'NO' at step 300 or at step 310, the timer T is reset at step 350 and the routine ends here. When the determination result is T<TM at step 330, the routine directly ends. In these three cases, as the flag FTC is not reset, the whole processes in FIG. 5, i.e., steps 160 to 180 of FIG. 4, are repeated without fail next time the routine in FIG. 4 is executed. On the other hand, when FTC is reset at 340 (i.e., step 180), or at step 180, the acceleration slip control, i.e., the steps 160 to 180 or the whole processings in FIG. 5, is not executed next time the routine in FIG. 4 is executed, unless the drive wheel speed Vr exceeds the high standby speed VSB value at step 130.

In the embodiment described above, the acceleration slip control is terminated only when two conditions are satisfied for a predetermined time period. The two conditions are: a decrease in the brake hydraulic pressure due to acceleration slip control and a decrease in the drive wheel speed Vr below the termination speed VLL. The termination condition may alternatively set as follows. When the secondary throttle valve opening $\theta$2 becomes greater than the the main throttle valve opening $\theta$M which is operated by the driver, the acceleration slip control is terminated, even if the predetermined time period has not elapsed. In this case, the acceleration slip control is also terminated quicker and the driver is able to accelerate the vehicle in a shorter time.

Obviously, numerous modifications and variation of the present invention are possible in light of the above teachings. It is therefore to be understood that within the scope of the opened claims, the invention may be practiced other than as specifically described herein.

What is claimed is:

1. A method for controlling a slip between a drive wheel of a vehicle and a road surface during acceleration, comprising the steps of:
   detecting a slip rate of the drive wheel;
   determining whether the detected slip rate is greater than a first preset value;
   starting a slip control for reducing the slip rate when the detected slip rate is determined to be greater than the first preset value, the slip control including at least actuating a brake system of the drive wheel;
   determining whether a brake force is less than a predetermined value;
   determining whether the detected slip rate is less than a second preset value after said brake system is actuated, the second preset value being less than the first preset value; and
   terminating the slip control after a preset time period during which the detected brake force is determined to be less than the predetermined value and the detected slip rate is determined to be less than the second preset value.

2. The accleration slip control method as claimed in claim 1, wherein the slip control further includes the step of reducing an output power of the engine of the vehicle.

3. The acceleration slip control method as claimed in claim 2, wherein the engine output power reducing step comprises the step of closing a secondary throttle valve provided in an intake pipe of the engine in series with a main throttle valve which is controlled by the accelerator pedal operation.

4. The acceleration slip control method as claimed in claim 3, wherein the brake system of the drive wheel is operated by hydraulic pressure whose pressure source is provided separately from an ordingary brake system actuated by a driver's brake operation, and wherein said brake force determining step comprises the step of determining the hydraulic pressure in said brake system.

5. The acceleration slip control method as claimed in claim 4, wherein the predetermined value is substantially zero.

6. The acceleration slip control method as claimed in claim 5, including the step of setting the first preset value at a value at which the dynamic friction force between the drive wheel and the road surface is greatest.

7. The acceleration slip control method as claimed in claim 6, including the step of setting the time period at a value slightly longer than a cycle time of the rotation speed fluctuation of the drive wheel arising due to the slip control.

8. A slip controller for a vehicle for controlling a slip between a drive wheel of the vehicle and a road surface during acceleration, comprising:
   means for detecting a slip rate of the drive wheel;
   means for determining whether the detected slip rate is greater than a first preset value;
   a drive wheel brake system;
   means for detecting the brake force of the drive wheel;
   means for determining whether the detected brake force is less than a predetermined value; and
   control means for starting a slip control for reducing slip rate when the detected slip rate is determined to be greater than the first preset value, using at least the brake system of the drive wheel, and for terminating the slip control after a preset time period during which the detected brake force is determined to be less than the predetermined value and the detected slip rate is determined to be less than a second preset value, the second preset value being less than the first preset value.

* * * * *